March 8, 1966     W. BRODBECK ETAL     3,238,929

ENGINE SEAL

Filed July 17, 1963

INVENTORS
WERNER BRODBECK
RICHARD EHRHARDT

BY Dicke + Craig

ATTORNEYS

United States Patent Office 3,238,929
Patented Mar. 8, 1966

3,238,929
ENGINE SEAL
Werner Brodbeck and Richard Ehrhardt, Stuttgart-Unterturkheim, Germany, assignors to Daimler-Benz Aktiengesellschaft, Stuttgart-Unterturkheim, Germany
Filed July 17, 1963, Ser. No. 295,626
Claims priority, application Germany, July 24, 1962,
D 39,442
9 Claims. (Cl. 123—8)

The present invention relates to a radial seal for rotary piston internal combustion engines of trochoidal construction, which essentially consists of two sealing ledge members, one disposed behind the other in the circumferential direction of the piston, within a groove of the piston extending parallelly to the axis thereof, which sealing ledge members are pressed radially outwardly by elastic means with the head portions thereof against the inner surfaces of the enclosure body.

With the use of two sealing ledge members disposed one behind the other in the circumferential direction of the piston as radial seal it has been discovered that the sliding friction between the two sealing ledge members is excessive and, in particular, is altogether too differingly excessive so that the desired movability of the individual sealing ledge members independently of the other is impaired. In order to eliminate these disadvantages, the present invention proposes to arrange between the two sealing ledge members a roller bearing in the form of ball bearings. A rolling friction between the sealing ledge members is achieved advantageously by the roller bearing of the present invention which rolling friction is smaller than a sliding friction and which remains still effective also in the presence of high gas pressures acting on both of the sealing ledge members, and is relatively little dependent on the prevailing lubricating conditions.

Advantageously, each roller bearing may consist of two balls disposed in radially extending ball channels disposed between the sealing ledge members which two balls are separated from each other by a pin disposed loosely within the ball channel or groove.

The individual movability of the sealing ledge members is aided by the fact that according to a further feature of the present invention the sealing ledge members are provided along the sides facing the flanks of the groove with apertures extending over the entire length of the sealing ledge members and a communication is provided from the aperture of the one sealing ledge member to the aperture of the other sealing ledge member by way of cross bores through the sealing ledge members.

Several springs may be arranged below the sealing ledge members of which each is individually supported at the groove bottom and presses with one resilient leg portion against the one sealing ledge member and with the other resilient leg portion against the other sealing ledge member which a position-securing of each spring is realized by insertion of the end of a leg portion into a respective bore provided in the corresponding sealing ledge member.

Accordingly, it is an object of the present invention to effectively eliminate the aforementioned disadvantages normally encountered with radial seals by simple means for rotary piston internal combustion engines of the type described hereinabove.

It is another object of the present invention to provide a radial seal consisting of two circumferentially spaced sealing ledge members which avoids the inadequacies of the prior art structures by simple means assuring reliable operation.

Still another object of the present invention resides in the provision of a radial seal consisting of two sealing ledges disposed one behind the other in the circumferential direction of the piston which assures under all operating conditions the desired free movability of the sealing ledge members within the respective grooves and with respect to one another.

A further object of the present invention resides in the construction of a double ledge radial seal for rotary piston internal combustion engines in which the movability of each ledge member is assured with simple means and in a safe manner.

Another object of the present invention resides in the provision of a radial seal for rotary piston internal combustion engines of the type described hereinabove in which the movability is relatively independent of the prevailing gas pressures and lubricating conditions.

These and other objects, features and advantages of the present invention will become more obvious from the following description when taken in connection with the accompanying drawing which shows, for purposes of illustration only, one embodiment in accordance with the present invention, and wherein.

Figure 1:
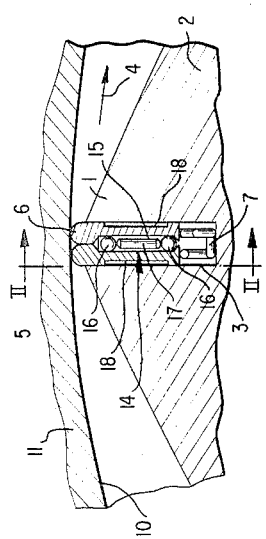
FIGURE 1 is a partial cross-sectional view taken at right angle to the axis of the engine through the piston corner of a rotary piston internal combustion engine provided with a radial seal in accordance with the present invention arranged therein.
Figure 2:
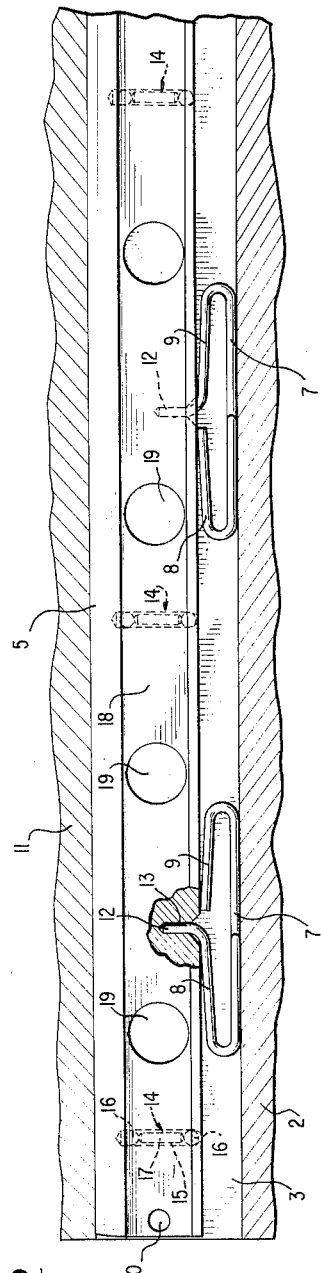
FIGURE 2 is a partial cross-sectional view, on an enlarged scale, taken along line II—II of FIGURE 1, through the radial seal in accordance with the present invention.
Figure 3:
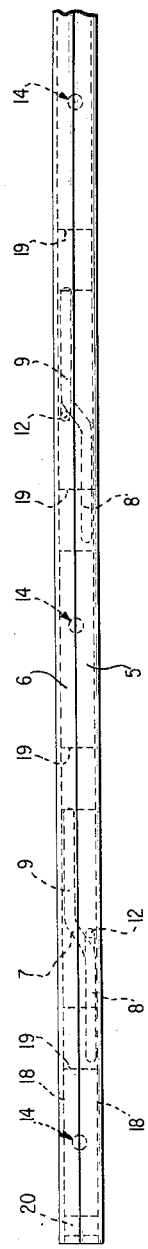
FIGURE 3 is a partial plan view on the radial seal in accordance with the present invention of FIGURE 2.

Referring now to the drawing wherein like reference numerals are used throughout the various views to designate like parts, and more particularly to FIGURE 1, a radial seal is arranged within the corner of the piston 2 in the groove 3 extending parallelly to the axis thereof which seal consists of two sealing ledge members 5 and 6 disposed one behind the other in the direction of rotation of piston 2 indicated by arrow 4. As will also appear fully more clearly from a consideration of FIGURES 2 and 3, springs 7 are arranged below the sealing ledge members 5 and 6 which are bent in such a manner that by engagement of one resilient leg portion 8 with the sealing ledge member 5 and of the other resilient leg portion 9 with the sealing ledge member 6 they press the sealing ledge members 5 and 6 with the head portions thereof against the inner surfaces 10 of the enclosure body 11. The springs 7 are provided at one resilient leg portion each with an extension 12 which project into bores 13, provided within the sealing ledge members 5 and 6 to lock the same into position. The arrangement is thereby made in such a manner that the one spring 7 is retained at the one sealing ledge member and the other spring 7 at the other sealing ledge member.

Roller bearings generally designated by reference numeral 14 are provided at the mutually facing side surfaces of the sealing ledge members 5 and 6 in order to attain a rolling friction. Two balls 16 each are arranged within the ball grooves 15 extending in the radial direction with respect to the piston which balls 16 are kept a distance from one another by a pin 17 arranged loosely within the ball grooves. The lower ball is thereby retained within each ball bearing in the respective ball groove by the fact that the sealing ledge members are so peened or bent-over within the area of the ball grooves that the ball grooves are partially closed-off at the lower ends of the sealing ledge members.

In order not to endanger individual movability of each sealing ledge member 5 and 6 with respect to each other and the movability of both sealing ledge members within the groove 5 by excessive side forces that are produced by the gas pressure, apertures 18 are arranged at the outer side walls of the sealing ledge members 5 and 6. These apertures 18 are in communication with one another at both sealing ledge members by cross bores 19 so that a pressure equalization from the one side to the other side takes place.

Cross bores 20 are arranged at the ends of the sealing ledge members 5 and 6 for purposes of assembly with the aid of which the two sealing ledge members may be kept together with assembled roller bearings by means of a wire or the like.

While we have shown and described one embodiment in accordance with the present invention, it is understood that the same is not limited thereto but is susceptible of numerous changes and modifications within the spirit and scope thereof as known to a person skilled in the art; and we, therefore, do not wish to be limited to the details shown and described herein but intend to cover all such changes and modifications as are encompassed by the scope of the appended claims.

We claim:

1. A radial seal for rotary piston internal combustion engines of trochoidal construction having an enclosure body with inner surfaces along which rotates a polygonal piston, comprising:
   groove means provided within said piston near the piston corner thereof and extending parallelly to the axis thereof,
   two sealing ledge means, one disposed behind the other in the direction of rotation of the piston, accommodated within said groove means,
   said sealing ledge means being provided with head portions,
   resilient means for pressing said sealing ledge means radially outwardly into engagement with the head portions thereof against the inner surfaces,
   and roller bearing means operatively disposed between the two sealing ledge means accommodated within one respective groove means.

2. A radial seal for rotary piston internal combustion engines of trochoidal construction having an enclosure body with inner surfaces along which rotates a polygonal piston, comprising:
   groove means provided within said piston near the piston corner thereof and extending parallelly to the axis thereof,
   two sealing ledge means, one disposed behind the other in the direction of rotation of the piston, accommodated within said groove means,
   said sealing ledge means being provided with head portions,
   resilient means for pressing said sealing ledge means radially outwardly into engagement with the head portions thereof against the inner surfaces,
   and roller bearing means operatively disposed between the two sealing ledge means accommodated within one respective groove means,
   each roller bearing means consisting of two bearing balls disposed within a radially extending ball groove disposed between two sealing ledge means, and a loosely arranged pin within the ball groove for separating the two balls within a respective groove.

3. A radial seal for rotary piston internal combustion engines of trochoidal construction having an enclosure body with inner surfaces along which rotates a polygonal piston, comprising:
   groove means provided within said piston near the piston corner thereof and extending parallelly to the axis thereof,
   two sealing ledge means, one disposed behind the other in the direction of rotation of the piston, accommodated within said groove means,
   said sealing ledge means being provided with head portions,
   resilient means for pressing said sealing ledge means radially outwardly into engagement with the head portions thereof against the inner surfaces,
   and roller bearing means operatively disposed between the two sealing ledge means accommodated within one respective groove means,
   the sealing ledge means being provided at the sides thereof facing the flanks of the groove means with apertures extending substantially over the entire length thereof, and cross bore means extending through said sealing ledge means for establishing a communication from the aperture means of one sealing ledge means to the aperture means of the other sealing ledge means.

4. A radial seal for rotary piston internal combustion engines of trochoidal construction having an enclosure body with inner surfaces along which rotates a polygonal piston, comprising:
   groove means provided within said piston near the piston corner thereof and extending parallelly to the axis thereof,
   two sealing ledge means, one disposed behind the other in the direction of rotation of the piston, accommodated within said groove means,
   said sealing ledge means being provided with head portions,
   resilient means for pressing said sealing ledge means radially outwardly into engagement with the head portions thereof against the inner surfaces,
   and roller bearing means operatively disposed between the two sealing ledge means accommodated within one respective groove means,
   said resilient means including a plurality of springs disposed below said sealing ledge means, each spring being individually supported against the groove bottom and having two resilient leg portions, one of the resilient leg portions of the spring pressing against the bottom of one of the sealing ledge means and the other resilient leg portion of the spring pressing against the other sealing ledge means, and position securing means constituted by the end of a leg portion of a spring insertetd into a corresponding bore provided in one of said sealing ledge means.

5. A radial seal for rotary piston internal combustion engines of trochoidal construction having an enclosure body with inner surfaces along which rotates a polygonal piston, comprising:
   groove means provided within said piston near the piston corner thereof and extending parallelly to the axis thereof,
   two sealing ledge means, one disposed behind the other in the direction of rotation of the piston, accommodated within said groove means,
   said sealing ledge means being provided with head portions,
   resilient means for pressing said sealing ledge means radially outwardly into engagement with the head portions thereof against the inner surfaces,
   and roller bearing means operatively disposed between the two sealing ledge means accommodated within one respective groove means,
   each roller bearing means consisting of two bearing balls disposed within a radially extending ball groove disposed between two sealing ledge means, and a loosely arranged pin within the ball groove for separating the two balls within a respective groove,
   the sealing ledge means being provided at the sides thereof facing the flanks of the groove means with apertures extending substantially over the entire length thereof, and cross bore means extending through said sealing ledge means for establishing a communication from the aperture means of one sealing ledge means to the aperture means of the other sealing ledge means.

6. A radial seal for rotary piston internal combustion engines of trochoidal construction having an enclosure body with inner surfaces along which rotates a polygonal piston, comprising:

groove means provided within said piston near the piston corner thereof and extending parallelly to the axis thereof, two sealing ledge means, one disposed behind the other in the direction of rotation of the piston, accommodated within said groove means, said sealing ledge means being provided with head portions, resilient means for pressing said sealing ledge means radially outwardly into engagement with the head portions thereof against the inner surfaces, and roller bearing means operatively disposed between the two sealing ledge means accommodated within one respective groove means, each roller bearing means consisting of two bearing balls disposed within a radially extending ball groove disposed between two sealing ledge means, and a loosely arranged pin within the ball groove for separating the two balls within a respective groove, said resilient means including a plurality of springs disposed below said sealing ledge means, each spring being individually supported against the groove bottom and having two resilient leg portions, one of the resilient leg portions of the spring pressing against the bottom of one of the sealing ledge means and the other resilient leg portion of the spring pressing against the other sealing ledge means, and position securing means constituted by the end of a leg portion of a spring inserted into a corresponding bore provided in one of said sealing ledge means.

7. A radial seal for rotary piston internal combustion engines of trochoidal construction having an enclosure body with inner surfaces along which rotates a polygonal piston, comprising:

groove means provided within said piston near the piston corner thereof and extending parallelly to the axis thereof, two sealing ledge means, one disposed behind the other in the direction of rotation of the piston, accommodated within said groove means, said sealing ledge means being provided with head portions, resilient means for pressing said sealing ledge means radially outwardly into engagement with the head portions thereof against the inner surfaces, and roller bearings means operatively disposed between the two sealing ledge means accommodated within one respective groove means, the sealing ledge means being provided at the sides thereof facing the flanks of the groove means with apertures extending substantially over the entire length thereof, and cross bore means extending through said sealing ledge means for establishing a communication from the aperture means of one sealing ledge means to the aperture means of the other sealing ledge means, said resilient means including a plurality of springs disposed below said sealing ledge means, each spring being individually supported against the groove bottom and having two resilient leg portions, one of the resilient leg portions of the spring pressing against the bottom of one of the sealing ledge means and the other resilient leg portion of the spring pressing against the other sealing ledge means, and position securing means constituted by the end of a leg portion of a spring inserted into a corresponding bore provided in one of said sealing ledge means.

8. In a radial seal for rotary piston internal combustion engines of trochoidal construction having an enclosure body provided with internal surfaces along which rotates a rotary piston, and including a groove within the piston corner extending parallelly to the axis thereof and accommodating therein two sealing ledges, one disposed behind the other in the direction of rotation of the piston, and resilient means for pressing the sealing ledges radially outwardly for engagement of the head portions thereof with said inner surfaces, the improvement essentially consisting of roller bearing means in the form of ball bearings between the two sealing ledges are accommodated within a respective groove.

9. In a radial seal for rotary piston internal combustion engines of trochoidal construction having an enclosure body provided with internal surfaces along which rotates a rotary piston, and including a groove within the piston corner extending parallelly to the axis thereof and accommodating therein two sealing ledges, one disposed behind the other in the direction of rotation of the piston, and resilient means for pressing the sealing ledges radially outwardly for engagement of the head portions thereof with said inner surfaces, the improvement essentially consisting of roller bearing means in the form of ball bearings between the two sealing ledges accommodated within a respective groove, each roller bearing consisting of two balls disposed within a ball groove and separated by a pin loosely arranged within the respective ball groove, and means providing a communication between apertures provided along the outer surfaces of each of said two sealing ledges including cross bore means, each of said springs being individually supported against the bottom of the groove and including two resilient leg portions, one of said leg portions engaging one of the sealing ledges and the other leg portion and the other sealing ledges, and one of said resilient leg portions being provided with a bent free end inserted into a corresponding bore provided in the respective sealing ledge to lock same in position.

No references cited.

SAMUEL LEVINE, *Primary Examiner.*